United States Patent [19]

Loper

[11] Patent Number: 5,512,067

[45] Date of Patent: Apr. 30, 1996

[54] ASYMMETRICAL MANNICH BASE DERIVATIVES AND THE PRODUCTION AND USES THEREOF

[75] Inventor: John T. Loper, Richmond, Va.

[73] Assignee: Ethyl Corporation, Richmond, Va.

[21] Appl. No.: 447,145

[22] Filed: May 22, 1995

[51] Int. Cl.$^6$ .................. C10L 1/18; C10L 1/22
[52] U.S. Cl. .................. 44/415; 44/419; 44/424; 564/47; 564/342; 564/443
[58] Field of Search .................. 44/415, 419, 424; 564/47, 342, 443

[56] References Cited

U.S. PATENT DOCUMENTS

| | | | |
|---|---|---|---|
| 3,413,347 | 11/1968 | Worrel | 260/570.5 |
| 3,725,277 | 4/1973 | Worrel | 252/51.5 R |
| 3,734,965 | 5/1973 | Becker | 260/570.5 P |
| 3,736,357 | 5/1973 | Piasek et al. | 564/47 |
| 3,948,619 | 4/1976 | Worrel . | |
| 3,985,802 | 10/1976 | Piasek et al. | 564/47 |
| 4,006,089 | 2/1977 | Chibnik | 252/51.5 R |
| 4,083,699 | 4/1978 | Chibnik . | |
| 4,160,648 | 7/1979 | Lewis et al. . | |
| 4,197,409 | 4/1980 | Lilburn | 560/158 |
| 4,231,759 | 11/1980 | Udelhofen et al. . | |
| 4,398,921 | 8/1983 | Rifkin et al. . | |
| 4,508,541 | 4/1985 | Kaufman et al. . | |
| 4,604,103 | 8/1986 | Campbell . | |
| 4,747,851 | 5/1988 | Sung et al. . | |
| 4,787,996 | 11/1988 | Horodysky et al. | 252/51.5 R |
| 4,944,770 | 7/1990 | Sung . | |
| 5,039,310 | 8/1991 | Blain et al. | 44/424 |
| 5,098,986 | 3/1992 | Speranza et al. | 528/149 |
| 5,387,266 | 2/1995 | Loper | 44/415 |

*Primary Examiner*—Jacqueline V. Howard
*Assistant Examiner*—Cephia Toomer
*Attorney, Agent, or Firm*—Dennis H. Rainear; William H. Thrower

[57] ABSTRACT

Compounds are described in which a polyamine moiety is linked to a phenolic moiety by a Mannich base linkage involving one of the amino groups of the polyamine moiety, and in which an aminoalkylene-poly(oxyalkylene) moiety is linked to the phenolic moiety by a Mannich base linkage involving an amino group of the alkylene-poly(oxyalkylene) moiety. Compounds of this type have been found to be highly effective in controlling the formation of intake valve deposits in internal combustion engines.

43 Claims, No Drawings

ASYMMETRICAL MANNICH BASE DERIVATIVES AND THE PRODUCTION AND USES THEREOF

TECHNICAL FIELD

This invention relates to novel Mannich base derivatives that can be used as fuel and lubricant additives.

BACKGROUND

Over the years a considerable amount of effort has been devoted to the discovery and development of chemical products having detergent and/or dispersant properties when used in hydrocarbonaceous fuels and/or natural and synthetic oils of lubricating viscosity. Fuel-soluble detergents are used in order to control the amount and character of deposits which tend to form in the fuel induction system of internal combustion engines. Oil-soluble detergent-dispersants are widely used in lubricating oils to control deposit and varnish formation, and to keep sludge and other solid matter is suspension in the oil. A small sampling of efforts along these lines is reflected in U.S. Pat. Nos. 3,413,347; 3,725,277; 3,948,619; 4,006,089; 4,083,699; 4,160,648; 4,197,409; 4,231,759; 4,398,921; 4,508,541; 4,604,103; 4,747,851; 4,787,996; 4,944,770; and 5,039,310.

The concomitant advent of Government regulations on engine emissions, the development of engines that operate at higher temperatures and with more sophisticated fuel induction systems, and the increasing use of new fuel blending components such as alcohols and ethers, has engendered the search for new, highly effective detergent-dispersant additives for use in fuels and lubricants.

THE INVENTION

This invention is based on the discovery that novel compounds can be formed by suitably linking together appropriate molecular segments in an appropriate sequence by means of appropriate linkages. The resultant condensation products, while complicated from a structural point of view, can be readily prepared in high yield by relatively simple processing using readily available starting materials.

In brief, the products of this invention contain at least three distinct and highly important segments, namely a polyamine moiety, a phenolic moiety derived from a phenolic compound, and an alkylene-poly(oxyalkylene) moiety having at least one amino group therein. The polyamine moiety is linked to the phenolic moiety by means of a Mannich base linkage involving one of the amino groups of the polyamine moiety, and the phenolic moiety is linked to the alkylene-poly(oxyalkylene) moiety by means of a Mannich linkage involving an amino group of the alkylene-poly(oxyalkylene) moiety. Thus the polyamine moiety is derived from a polyamine by loss of a hydrogen atom from an amino group, and the alkylene-poly(oxyalkylene) moiety having at least one amino group therein is derived from an amino-substituted alkylene-poly(oxyalkylene) compound by loss of a hydrogen atom from an amino nitrogen atom thereof.

Preferably, the respective Mannich linkages are in positions ortho to a hydroxyl group of the phenolic moiety, but one group can be in an ortho position and the other in a para position relative to a hydroxyl group of the phenolic moiety.

In one of its forms, this invention involves the provision of a compound of the formula:

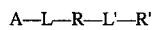  (1)

wherein A is a polyamine group having 2 to 10 nitrogen atoms, and is derived from a polyamine; R is a phenolic group (e.g., a hydroxyaryl group, preferably a hydroxyphenyl group) derived from a hydroxyaromatic compound; R' is an alkylenepoly(oxyalkylene) group derived from an amino-substituted alkylenepoly(oxyalkylene) compound, and in which the alkylene groups can be the same or different and contain from 2 to 20 carbon atoms each; L is a methyleneamino linkage (i.e., a Mannich base linkage) in which the amino nitrogen atom is one of the nitrogen atoms of the polyamine group; and L' is a methyleneamino linkage (i.e., a second Mannich base linkage) in which the nitrogen atom of L' is a nitrogen atom of an amino group of the alkylenepoly(oxyalkylene) group.

Linkage L may be depicted as follows:

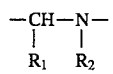

where $R_1$ and $R_2$ can be the same or different and each individually is a hydrogen atom or a carbon-bonded organic group (and if a carbon-bonded organic group it is preferably a hydrocarbyl group). Most preferably $R_1$ and $R_2$ are both hydrogen atoms. Linkage L' may be depicted as follows:

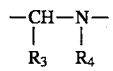

where $R_3$ and $R_4$ can be the same or different and each individually is a hydrogen atom or a carbon-bonded organic group. Preferably, $R_3$ is a hydrogen atom, but if $R_3$ is a carbon-bonded group, preferably it is a hydrocarbyl group. In one preferred embodiment, $R_3$ and $R_4$ are both hydrogen atoms. In another preferred embodiment $R_3$ is a hydrogen atom and $R_4$ is an alkylene group of an alkylenepoly(oxyalkylene) group having either a terminal hydrogen atom or an amino group.

The alkylene groups in the compounds of formula (1) can be the same or different and contain from 2 to 20 carbon atoms each, and the average number of oxyalkylene groups in the compound will typically be in the range of 2 to about 150, preferably in the range of 2 to about 100, more preferably in the range of about 5 to about 90, and most preferably in the range of about 10 to about 80. The terminal alkylene or oxyalkylene group(s) not bonded to the nitrogen atom of the above "second" Mannich linkage, L', will typically be substituted by an amino, hydroxyl or other terminal substituent present in the amino-substituted alkylenepoly(oxyalkylene) compound from which R' is derived.

One preferred embodiment is compounds of formula (1) above wherein A, L, R, and L' are as defined above and R' is an amino-substituted alkylenepoly(oxyalkylene) group derived by removal of one amino hydrogen atom from a polyamino-substituted alkylenepoly(oxyalkylene) compound of the formula:

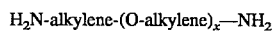  (2)

wherein the alkylene groups can be the same or different and contain from 2 to 20 carbon atoms each, and x is an average number in the range of 2 to about 150, preferably in the range of 2 to about 100, more preferably in the range of about 5 to about 90, and most preferably in the range of about 10 to about 80.

Another preferred embodiment is compounds of formula (1) above wherein A, L, R, and L' are as defined above and R' is an amino-substituted alkylenepoly(oxyalkylene) group derived by removal of one amino hydrogen atom from a polyamino-substituted alkylenepoly(oxyalkylene) compound of the formula:

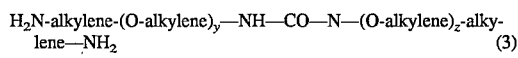

$$H_2N\text{-alkylene-}(O\text{-alkylene})_y\text{—NH—CO—N—}(O\text{-alkylene})_z\text{-alkylene—}NH_2 \qquad (3)$$

wherein the alkylene groups can be the same or different and contain from 2 to 20 carbon atoms each, and y and z can be the same or different and each is typically an average number in the range of from 2 to 20.

Still another preferred embodiment is compounds of formula (1) above wherein A, L, R, and L' are as defined above and R' is a polyamino-substituted alkylenepoly(oxyalkylene) group derived by removal of one amino hydrogen atom from a polyamino-substituted alkylenepoly(oxyalkylene) compound of the formula:

$$Q\begin{cases}(O\text{-alkylene})_a\text{-}NH_2 \\ (O\text{-alkylene})_b\text{-}NH_2 \\ (O\text{-alkylene})_c\text{-}NH_2\end{cases} \qquad (4)$$

where Q is the hydrocarbyl residue of a triol initiator such as trimethylol propane, trimethylol butane, triethylol propane, glycerine, etc., "alkylene" is as defined above, and a, b and c can be the same or different and each is typically an average number in the range of from 1 to about 35. Usually, the sum of a, b and c is in the range of about 5 to about 100. It will be noted that oxyalkylene triamines of the type of formula (4) are typically formed by reacting an alkylene oxide with triol initiator (e.g., trimethylol propane, glycerine, etc.) and aminating the terminal hydroxyl groups.

A particularly preferred embodiment is compounds of formula (1) above wherein A, L, R, and L' are as defined above and R' is an amino-substituted alkylenepoly(oxyalkylene) group derived by removal of one amino hydrogen atom from an amino-substituted alkylenepoly(oxyalkylene) compound of the formula:

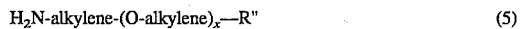

$$H_2N\text{-alkylene-}(O\text{-alkylene})_x\text{—}R'' \qquad (5)$$

wherein the alkylene groups can be the same or different and contain from 2 to 20 carbon atoms each, preferably from 2 to 5 carbon atoms each, most preferably a mixture of ethylene groups and methylethylene groups, x is an average number in the range of 2 to about 150, preferably in the range of 2 to about 100, more preferably in the range of about 10 to about 60, and most preferably in the range of about 10 to about 40, and R" is a hydrocarbyl group of up to about 18 carbon atoms, and preferably an alkyl group of up to 12 carbon atoms, e.g., methyl. Products of this type currently available commercially have molecular weights of up to about 2000.

In the compounds of this invention, the phenolic group, R, is preferably substituted on the ring by one or more hydrocarbyl groups—e.g., aliphatic or cycloaliphatic groups—each of which is free of acetylenic unsaturation. While the ring can thus be substituted, for example, by up to three acyclic hydrocarbyl substituents such as methyl or ethyl groups, usually the ring will have less than three acyclic hydrocarbyl substituents, and typically will have from 1 to 2 hydrocarbyl substituents, and most preferably one hydrocarbyl substituent.

Preferred compounds of this invention are as depicted and described above wherein R is an hydrocarbylphenolic group derived from a mononuclear phenolic compound having at least one hydrocarbyl substituent on the phenolic ring, most preferably an aliphatic group that is saturated or substantially saturated, having from 1 to about 100 carbon atoms; A is a polyamine group having 2 to about 6 (or an average between 2 and 6) nitrogen atoms, most preferably derived from an alkylene polyamine or an alkoxyalkylene polyamine; R' is an alkylenepoly(oxyalkylene) group derived from an amino-substituted alkylenepoly(oxyalkylene) compound in which the alkylene groups can be the same or different and contain 2 to 10, more preferably 2 to 5 and still more preferably 3 to 4 carbon atoms each; and L and L' are as described above. R will preferably contain a single alkyl substituent having about 8 to about 100 carbon atoms (most preferably in the para position) or, alternatively and less preferably, two alkyl substituents one having about 4 to about 20 carbon atoms (which most preferably is in the para position, but which may be in an ortho position) and one methyl or ethyl group in a meta position. In other words, the mononuclear phenol used in forming the compounds of this invention will have its two ortho positions unsubstituted (in which case the para position should be substituted) or the mononuclear phenol will have its para position and one of the ortho positions unsubstituted (in which case the other ortho position should be substituted).

The compounds of described above can be formed in a two-stage Mannich process. While it is possible to conduct the two stages concurrently, it is preferred to carry out the process in two sequential stages. Likewise, although the order in which the two stages are conducted is not critical, in cases where either the polyamine or the amino-substituted alkylene-poly(oxyalkylene) compound to be used as a reactant has a lesser number of primary amino groups (or if no primary amino groups, a lesser number of secondary amino groups) in the molecule than the other such reactant, it is preferable to first conduct the Mannich process with the reactant having the lesser number of primary (or such secondary) amino groups in the molecule.

Similar reaction conditions can be used for the two stages of Mannich condensations used in forming the compounds of this invention. In the first stage the reaction is among the initial phenolic reactant, an aldehyde such as formaldehyde, acetaldehyde, propionaldehyde, furfuryl aldehyde, etc. (preferably formaldehyde or a formaldehyde-producing reagent such as paraformaldehyde), and either (i) a polyamine having at least one primary or secondary amino group (preferably at least one terminal primary amino group) capable of undergoing a Mannich condensation reaction, or (ii) an alkylene-poly(oxyalkylene) compound having at least one primary or secondary amino group (preferably at least one terminal primary amino group) capable of undergoing a Mannich condensation reaction. With reference to Formula (1) above, the reactants are proportioned to form an intermediate Mannich condensation product in which the R group has a high proportion of mono-substitution by the A—L-group (if (i) is used) or of the R'—L'-group (if (ii) is used). In the second stage the Mannich condensation is among an intermediate Mannich condensation product formed as in the first stage, an aldehyde such as formaldehyde, acetaldehyde, propionaldehyde, furfuryl aldehyde, etc. (preferably formaldehyde or a formaldehyde-producing reagent such as paraformaldehyde), and whichever of (i) and (ii) was not used in the first stage. If desired, the intermediate product can be subjected to a purification step before conducting the second stage reaction. Chromatographic separation procedures such as gel permeation chromatography, or other suitable purification procedures may be used to recover a purer intermediate product should this be desired. Ordinarily, however, purification of the intermediate is unnecessary.

The above and other embodiments of this invention will be still further apparent from the ensuing description and appended claims.

Polyamines

The chief requirements of this reactant are that it contain at least two basic nitrogen atoms, at least one of which is in the form of a primary or secondary amino group disposed in the molecule such that it is capable of undergoing a Mannich condensation with the phenolic reactant and the aldehyde reactant selected for use.

The polyamines can be hydrocarbyl amines or hydrocarbyl amines containing one or more suitable substituents such as ether oxygen atoms (—O—), hydroxyl groups (—OH), thioether sulfur atoms (—$S_n$—), mercapto groups (—SH), halogen atoms (—X), keto groups (>CO), thioketo groups (>CS), carboxyl groups (—COOH), ester groups (—COOR), nitrilo groups (—CN), thiocyano groups (—SCN), nitro groups (—$NO_2$), hetero nitrogen atoms (—N=), and the like, provided that each substituted hydrocarbyl group of the amine retains its predominantly hydrocarbonaceous character. When substituted polyamines are used, they preferably have one or two ether oxygen linkages, one or more thioether linkages, one or more hetero nitrogen atoms and/or one or more hydroxyl groups.

Illustrative polyamines which may be employed in forming the compounds of this invention include such compounds as tetraaminoneopentane; N,N'-di(β-aminoethyl)imidazolidone-2; 2-(2-aminoethylamino)-5-nitropyridine; 3-amino-N-ethylpiperidine; 2-(2-aminoethyl)-pyridine; 5-aminoindole; N-aminoethylpiperazine; N,N'-bis(aminoethyl)piperazine; 4-(aminomethyl)-piperidine; ethylenediamine; 1,2-propylenediamine; 1,3-propylene diamine; methylaminopropylenediamine; dipropylenetriamine; di-(1,2-butylene)triamine; N-(2-aminoethyl)-1,3-propanediamine; hexamethylenediamine; N-(β-cyanoethyl)ethane-1,2-diamine; 1,3,6,9-tetraaminooctadecane; 1,3,6-triamino-9-oxadecane; N-methyl-1,2-propanediamine; tetra-(1,2-propylene)pentamine; diethylenetriamine; triethylenetetramine; tetraethylenepentamine; pentaethylenehexamine; adenine; cytosine; guanidine; aminoguanidine; guanylurea; N-(2-aminoethyl)-piperidine; N-(2-aminoethyl)-pyrrolidine; 1,7-diaminoheptane; 1,8-diaminooctane; 1,10-diaminodecane; 1,12-diaminododecane; 3,3-diaminodipropylamine; p-phenylenediamine; N,N'-diaminoguanidine; 1,3-diamino-N-(β-hydroxyethyl)propane; 4,5-diamino-6-hydroxy-2-mercaptopyrimidine; 1,3-di-amino-2-propanol; 2,4-diamino-6-hydroxypyrimidine; 1,8-diamino-p-menthane; 4,6-diamino-2-mercaptopyrimidine; 1,4-diaminopiperazine; 2,6-diaminopyridine; 3,4-diaminopyridine; 3,5-diamino-1,2,4-triazole; 2,4,6-triaminopyrimidine; triaminoguanidine; and the like.

It should be apparent from these illustrative compounds that the polyamines can be aliphatic, cycloaliphatic, aromatic, heterocyclic, aliphatic and cycloaliphatic, aliphatic and aromatic, aliphatic and heterocyclic, cycloaliphatic and aromatic, cycloaliphatic and heterocyclic, aromatic and heterocyclic, etc., in structure; that they may be saturated or contain olefinic, acetylenic and/or aromatic unsaturation; and that they may or may not contain other functional substituents, as long as the compound contains at least one amino group capable of forming a Mannich base linkage, and at least one other basic nitrogen atom. Mixtures of suitable polyamines can be used, such as for example, commercial mixtures of straight chain, branched chain and cyclic ethylene polyamines having approximate overall compositions falling in the range corresponding to diethylene triamine to pentaethylene hexamine. The compounds of this invention can be formed from polyamines having combinations of primary or secondary and tertiary amino groups in the molecule. In general, compounds formed from polyamines having at least two primary amino groups, especially aliphatic polyamines, are preferred.

Also suitable are high molecular weight hydrocarbyl polyamines typically formed by reacting aliphatic or alicyclic polyhalides (or mixture thereof) containing an average of at least about 40 carbon atoms with one or more amines, such as polyalkylene polyamines. Examples of such hydrocarbyl polyamines and the preparation thereof are described in U.S. Pat. Nos. 3,275,554; 3,438,757; 3,454,555; 3,565, 804; 3,671,511; 3,821,302; 3,394,576; and in European Patent Publication No. 382,405, all disclosures of which are incorporated herein by reference. In general, the hydrocarbyl groups of these hydrocarbyl polyamines typically have a number average molecular weight in the range of about 500–10,000, more usually in the range of about 750–5,000, and often in the range of 1000–2500 and normally are of branched-chain structure, having 0–2 sites of unsaturation. The hydrocarbyl groups are typically derived from petroleum mineral oil, or polyolefins, either homopolymers or higher-order polymers, typically formed from 1-olefins of from 2–6 carbon atoms. such as ethylene, propylene, isobutylene, 1-butene, amylenes, etc., or combinations thereof.

Phenolic Compounds

While the phenolic compound can be phenol itself, preferably it is substituted on the ring by from 1 to 3, and more preferably by from 1 to 2 hydrocarbyl groups. Still more preferably the ring has but 1 hydrocarbyl substituent. Such hydrocarbyl groups can range from lower alkyl or alkenyl groups (viz., alkyl groups of 1 to about 6 carbon atoms or alkenyl groups of 2 to about 6 carbon atoms) up to long chain hydrocarbyl groups having 500 or more carbon atoms such as alkyl or alkenyl groups derived from polypropenes, polybutenes, polyisobutenes, polyamylenes, copolymers of ethylene and propylene, copolymers of ethylene and butene, copolymers of ethylene and isobutene, copolymers of propene and isobutene, copolymers of propene, butene and isobutene, and the like, having number average molecular weights of up to about 3000 or more. The hydrocarbyl group(s) can also be cycloalkyl or cycloalkenyl groups, aryl groups, aralkyl groups, polyunsaturated aliphatic hydrocarbyl groups, or the like. The number of hydrocarbyl groups present on the phenolic ring (which cannot exceed three) will to some extent be dependent upon steric factors such as the size and structure of the hydrocarbyl group. When substituted, the phenolic compound will usually have one or two hydrocarbyl groups, preferably one hydrocarbyl group. In many cases the longer chain hydrocarbyl group(s) will be bonded to the phenolic ring by a secondary or tertiary carbon atom. On the other hand, the short chain hydrocarbyl group(s) will be bonded to the phenolic ring by primary, secondary or tertiary carbon atoms. In all cases, the phenolic compound used will at least have either (i) two unsubstituted ortho positions or (ii) one unsubstituted ortho position and an unsubstituted para position. It will of course be understood that in accordance with conventional chemical nomenclature the term "unsubstituted" means that the "unsubstituted" carbon atoms in question each have a hydrogen atom as the substituent thereon. In addition, both such unsubstituted positions will be sufficiently unhindered as to be capable of undergoing the Mannich reaction with the selected co-reactants.

Thus the phenolic moiety can be derived from such phenols as o-, m- and/or p-cresol; o- and/or p-tert-amylphenol; o-benzylphenol; p-benzylphenol; p-sec-butylphenol; o-tert-butylphenol; p-tert-butylphenol; o-cyclohexylphenol; o-cyclohexenylphenol; p-octylphenol (where the octyl group is derived from isobutene dimer); p-nonylphenol (where the nonyl group is derived from propene trimer); p-dodecylphenol (where the dodecyl group is derived from isobutene trimer); monoalkylated phenols derived from oligomers or polymers of propene having from 4 up to about 100 propene units per molecule; monoalkylated phenols derived from oligomers or polymers of isobutene, having from 4 up to about 100 isobutene units per molecule; 4-hydroxydiphenyl; 2,3-xylenol; 2,5-xylenol; monoalkylated m-cresol wherein the alkyl group is derived from propene dimer, propene trimer, and/or higher oligomers or polymers of propene; monoalkylated m-cresol wherein the alkyl group is derived from isobutene dimer, isobutene trimer, and/or higher oligomers or polymers of isobutene; 3,4,5-trimethylphenol; monoalkylated 3,5-xylenol wherein the alkyl group on the phenolic ring is derived from propene dimer, propene trimer, and/or higher oligomers or polymers of propene; p-styrylphenol; and the like. One preferred type of phenolic compounds for use in forming the compounds of this invention are monoalkylated phenols derived from polymers of propene having a molecular weight by vapor phase osmometry in the range of about 800 to about 1000.

The phenolic compound can be a fused ring compound such as 1-naphthol, hydrocarbyl-substituted 1-naphthols having the ortho and para positions unsubstituted and suitably unhindered, 2-naphthol, hydrocarbyl-substituted 2-naphthols having both ortho positions unsubstituted and suitably unhindered. Likewise use can be made of diphenolic compounds such as the dihydroxydiphenyls and their suitable hydrocarbyl-substituted analogs that have at least two ortho positions, or two para positions or one ortho and one para position unsubstituted and suitably unhindered; the alkylene-bridged dihydroxydiphenyls and their suitable hydrocarbyl-substituted analogs that have at least two ortho positions, or two para positions or one ortho and one para position unsubstituted and suitably unhindered, and like compounds, provided that the hydroxyaromatic compound is able to undergo the Mannich reaction with the aldehyde and polyamine selected for use therewith.

Amino-substituted alkylene-poly(oxyalkylene) compounds

Alkylene-poly(oxyalkylene) monoamines and polyamines suitable for use in forming the products of this invention are typically amine-terminated compounds having an average of at least two polyoxy-alkylene groups per molecule. Generally speaking these compounds have average molecular weights in the range of about 200 to about 10,000, and preferably in the range of about 200 to about 6000. The alkylene groups in these compounds can be the same or different and generally will each contain from 2 to 20, preferably from 2 to 10, more preferably from 2 to 5 and still more preferably from 3 to 4 carbon atoms. When different alkylene groups are present, these can be randomly disposed within the poly(oxyalkylene) chain or they can be arranged in blocks within the chain, such as for example one or more oxyethylene groups followed by a block of oxypropylene groups, or one or more oxyethylene groups followed by a block of oxybutylene groups followed by one or more oxyethylene groups, etc. Usually the alkylene groups will have the configuration:

—CHR"—CH$_2$— where R" is a hydrogen atom or a $C_1$–$C_{18}$ alkyl group, preferably a hydrogen atom or a $C_1$–$C_8$ alkyl group, more preferably a hydrogen atom or a $C_1$–$C_3$ alkyl group, and still more preferably a $C_1$–$C_2$ alkyl group. Compounds in which at least 90% of the oxyalkylene groups are oxypropylene (R" is methyl) or oxybutylene (R" is ethyl) or a combination of oxypropylene and oxybutylene groups are particularly preferred.

Various types of amine-terminated alkylene-poly(oxyalkylene) compounds can be used in forming the compounds of this invention. For example, amine-terminated alkylene-poly(oxyalkylene) compounds of formulas (3), (4) and (5) (or mixtures thereof) are well-suited for this purpose. Likewise amino-substituted alkylene-poly(oxyalkylene) compounds in which one or more alkylene group(s) and/or poly(oxyalkylene) group(s) are terminated by hydroxyl, tertiary amino groups, and/or hydrocarbyloxy group(s), e.g., alkoxy such as methoxy, ethoxy, etc., can be used.

Methods for the preparation of the amine-terminated alkylene-poly(oxyalkylene) compounds are known and reported in the literature. Indeed a number of such compounds are available as articles of commerce. By way of example, use can be made of products available under the Jeffamine trademark, such as Jeffamine® D-230, D-400, D-2000, D-4000, DU-700, ED-600, ED-900, ED-2001, ED-4000, ED-6000, T-403, T-3000, T-5000, DB-2001, and equivalent products. The Jeffamine® diamine D-series have the structure:

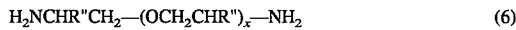

H$_2$NCHR"CH$_2$—(OCH$_2$CHR")$_x$—NH$_2$ (6)

where each R" is a methyl group. Individual products of this type are as indicated in the Table I.

TABLE I

| Product Designation | Value of x | Approximate Molecular Weight |
|---|---|---|
| D-230 | 2–3 | 230 |
| D-400 | 5–6 | 400 |
| D-2000 | 33 (Avg.) | 2,000 |
| D-4000 | 68 (Avg.) | 4,000 |

Jeffamine DB-2001 has the structure of Formula (6) above except that each R" is ethyl and the product has an approximate molecular weight of 2,000.

The Jeffamine ED-series of polyether diamines are depicted by the formula:

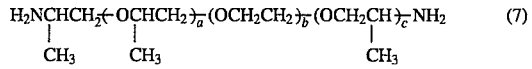

Individual products of this type are identified in the Table II.

TABLE II

| Product Designation | Approximate Value of b | Approximate Value of a + c | Approximate Molecular Weight |
|---|---|---|---|
| ED-600 | 8.5 | 2.5 | 600 |
| ED-900 | 15.5 | 2.5 | 900 |
| ED-2001 | 40.5 | 2.5 | 2,000 |
| ED-4000 | 86.0 | 2.5 | 4,000 |

Jeffamine DU-700 has the structure of Formula (3) above wherein each "alkylene" is an isopropylene group, and each of y and z is from 5 to 6.

The individual products of the T-series of Jeffamine® triamines have the structure of Formula (4) above in which each "alkylene" is an isopropylene group, and A is the hydrocarbyl residue of the triol initiator identified in the Table III.

TABLE III

| Product Designation | Triol Initiator | Approximate Molecular Wt. | Mols of Propylene Oxide |
|---|---|---|---|
| T-403 | Trimethylolpropane | 440 | 5–6 |
| T-3000 | Glycerine | 3,000 | 50 |
| T-5000 | Glycerine | 5,000 | 85 |

One particularly preferred group of amine-terminated alkylene-poly(oxyalkylene) compounds is comprised of polyether monoamines of Formula (5) above. Individual products of this type are in the M-series of Jeffamine® monoamines which have the structure of Formula (5) above in which the "alkylene" groups are mixtures of ethylene and isopropylene groups, and R" is a methyl group which is the hydrocarbyl residue resulting from the use of methanol as the monohydric initiator with ethylene oxide and propylene oxide. The terminal hydroxyl group of the resultant product is then converted to an amino group. Table IV identifies particular products of this series of suitable reactants.

TABLE IV

| Product Designation | Initiator | Mol Ratio, PO/EO | Approximate Molecular Wt. |
|---|---|---|---|
| M-600 | Methanol | 9/1 | 600 |
| M-715 | Methanol | 2/13 | 715 |
| M-1000 | Methanol | 3/19 | 1000 |
| M-2005 | Methanol | 32/3 | 2000 |
| M-2070 | Methanol | 10/32 | 2000 |

Aldehydes

Aldehydes useful in the Mannich condensation reactions are typified by acetaldehyde, propionaldehyde, butyraldehyde, furfuryl aldehyde, cinnamaldehyde, decyl aldehyde, citral, crotonaldehyde, acrolein, glyoxal, heptaldehyde, methacrolein, tetradecyl aldehyde, and the like. The preferred aldehydes are formaldehyde and formaldehyde-producing reagents such as paraformaldehyde and formalin.

Reaction Conditions

The reaction conditions used in the Mannich reactions involve temperatures in the range of from about 65° to about 160° C. The reactants are preferably employed in amounts such that there are from about 1 to about 4 mols of aldehyde and from about 0.5 to about 2 mols of polyamine or amino-substituted alkylenepoly(oxyalkylene) compound per mole of initial phenolic reactant or intermediate phenolic product from the first stage reaction. Preferred proportions are from about 1 to about 2 mols of aldehyde and from about 0.5 to about 1 mol of polyamine or amino-substituted alkylenepoly(oxyalkylene) compound per mole of initial phenolic reactant or intermediate phenolic product from the first stage reaction. The reactions can be conducted either in bulk (i.e., without a solvent) or in a suitable inert liquid diluent or solvent such as toluene, xylene, petroleum ethers, ligroin, etc. In either case, water evolved in the reactions is preferably removed from the reaction system. When conducting the process stages in bulk, reaction times of up to about 12 hours for each stage are typical. On the other hand, when conducting the process stages in a solvent, shorter reaction times can be employed. For example, when conducting the reaction in a diluent and removing the water via azeotropic distillation, reaction times in the range of from 0.5 to 2 hours can be used in each stage.

The following examples illustrate the manner by which various products of this invention can be prepared. These examples are not intended to limit, do not limit, and should not be interpreted as limiting the practice of the generic aspects of this invention.

EXAMPLE 1

Stage 1

To a reaction flask equipped with a stirrer, a Dean-Stark trap, and a heating mantle, are charged 52.5 grams (0.2 mol) of 4-dodecylphenol, 402.6 grams (0.2 mol) of Jeffamine M-2005, 6.3 grams of 95% paraformaldehyde, and 300 grams of xylene. While stirring, the mixture is heated to reflux and water evolved during the reaction is collected in the Dean-Stark trap. The heating is discontinued when approximately 3.6 mL of water has been collected.

Stage 2

To the product of Stage 1 are charged 29.3 grams (0.2 mol) of commercial grade triethylene tetramine and 6.3 grams (0.2 mol) of 95% paraformaldehyde. The constantly-stirred mixture is heated to reflux and water evolved during the reaction is collected in the Dean-Stark trap. When approximately 4 mL of water has been collected, a vacuum is applied to the system, and the reaction mixture is concentrated by distilling off xylene diluent and traces of residual water, if any.

EXAMPLE 2

Stage 1

To a reaction flask equipped as in Example 1 are charged 78.7 grams (0.3 mol) of 4-dodecylphenol, 31.4 grams of 37% formaldehyde, 300 grams (0.3 mol) of Jeffamine M-1000, and 350 grams of xylene. While stirring, the mixture is heated to reflux and water and water-xylene azeotrope evolved during the reaction is collected in the Dean-Stark trap. The heating is discontinued when approximately 22 mL of water and 38 mL of xylene has been collected in the trap.

Stage 2

To 159.2 grams (0.125 mol) of the product of Stage 1 are charged 18.2 grams (0.125 mol) of commercial grade triethylene tetramine and 14.4 grams of 37% formaldehyde. The constantly-stirred mixture is heated to reflux and water evolved during the reaction is collected in the Dean-Stark trap. When approximately 11.3 mL of water has been collected, a vacuum is applied to the system, and the reaction mixture is concentrated by distilling off xylene diluent and traces of residual water, if any. A yield of 177.3 grams (99%) of product was formed using this procedure.

EXAMPLE 3

Using the general procedure of stage 2 of Example 2, a mixture of 159.7 grams of the stage 1 product of Example 2, 13.2 grams of 37% formaldehyde and 12.9 grams of diethylene triamine is refluxed in 250 grams of xylene solvent and then stripped under vacuum. The concentrated end product weighed 167.4 grams (96.2% yield).

EXAMPLE 4

Stage 1

To a reaction flask equipped as in Example 1 are charged 31.2 grams (0.5 mol) of 4-dodecylphenol, 40.5 grams of 37% formalin, 66.7 grams (0.5 mol) of N-tridecyloxypropyl-1,3-propanediamine, and 280 grams of toluene. The mixture is stirred and heated at reflux until water evolution ceases, and then concentrated by distilling off residual toluene at reduced pressure.

Stage 2

A mixture of 152 grams of the product from stage 1, 20.2 grams of 37% formalin and 250 grams of Jeffamine M-1000 in 300 grams of toluene is formed, stirred and heated at reflux until cessation of water evolution, and then concentrated as in stage 1.

EXAMPLE 5

The procedure of stage 2 of Example 4 is repeated except that 501.2 grams of Jeffamine M-2005 is used in place of the Jeffamine M-1000.

EXAMPLE 6

Stage 1

The procedure of stage 1 of Example 3 is repeated except that the N-tridecyloxypropyl-1,3-propanediamine is replaced by 0.5 mol of N-decyloxypropyl-1,3-propanediamine.

Stage 2

A mixture is formed from 70.5 grams of the stage 1 product, 10.2 grams of 37% formalin, and 250.6 grams of Jeffamine M-2005 using 250 grams of toluene as solvent. The mixture is stirred and heated at reflux until cessation of water evolution, and then concentrated by distilling off solvent at reduced pressure.

EXAMPLE 7

The procedure of stage 2 of Example 6 is repeated using the following materials: 141 grams of the stage 1 product of Example 6, 20.3 grams of 37% formalin, 250 grams of Jeffamine M-1000 and 250 grams of toluene.

EXAMPLE 8

The procedure of stage 2 of Example 6 is again repeated but using the following materials: 70.5 grams of the stage 1 product of Example 6, 10.1 grams of 37% formalin, 250 grams of Jeffamine D-2000 and 250 grams of toluene.

EXAMPLE 9

To a reaction flask equipped as in Example 1 are charged 262.4 grams (1.0 mol) of 4-dodecylphenol, 81.1 grams (1.0 mol) of 37% formaldehyde solution, 129.2 grams (1.0 mol) of N-aminoethylpiperazine, and 300 grams of xylene. While stirring, the mixture is refluxed until water evolution (about 70 mL) ceases. The product is then concentrated at reduced pressure.

Stage 2

To 50.8 grams (0.126 mol) of the product of Stage 1 are charged 252.7 grams (0.126 mol) of Jeffamine M-2005, 14.2 grams of 37% formaldehyde solution and 300 grams of xylene. The constantly-stirred mixture is heated at reflux and water evolved during the reaction is collected in the Dean-Stark trap. When cessation of water evolution occurs, a vacuum is applied to the system, and the reaction mixture is concentrated by distilling off the xylene diluent and traces of residual water, if any.

EXAMPLES 10-20

Additional compounds of this invention are formed by use of the general procedures of the foregoing examples. The materials (other than the formaldehyde and reaction solvent) used are set forth in Table V. The following abbreviations are used therein:

TABLE V

| Example | Polyamine | Phenol | Jeffamine Product |
|---------|-----------|----------------|-------------------|
| 10 | DETA | 4-dodecylphenol | M-2005 |
| 11 | DETA | 4-nonylphenol | D-2000 |
| 12 | DETA | 4-nonylphenol | M-1000 |
| 13 | DOPPD | PPP | M-2005 |
| 14 | DOPPD | Bisphenol A | M-2005 |
| 15 | APM | 4-nonylphenol | M-2005 |
| 16 | TOPPD | PPP | M-1000 |
| 17 | DOPPD | 4-nonylphenol | D-2000 |
| 18 | TOPPD | 4,4'-bisphenol | M-1000 |
| 19 | EDA | PPP | M-2005 |
| 20 | AEP | PPP | D-2000 |

DETA diethylene triamine
DOPPD N-decyloxypropyl-1,3-propanediamine
APM N-aminopropyl morpholine
TOPPD N-tridecyloxypropyl-1,3-propanediamine
EDA ethylene diamine
AEP N-aminoethylpiperazine
PPP phenol monoalkylated by polypropene having a molecular weight by vapor phase osmometry in the range of about 800 to about 1000

The compounds of this invention are useful as additives for fuels and lubricants wherein they can be used either as detergent/dispersants or as rust or oxidation inhibitors. To assess their effectiveness as detergents use may be made of comparative engine tests in which the amount of intake valve deposits (IVD) formed when operating the engine for a test period of 150 hours on the test fuel is determined. The base fuel used in such tests is an additive-free gasoline. Each test starts with a clean intake valve and upon completion of the 150-hour test, the weight of the intake valve deposits is determined. The lower the weight of deposits, the more effective the composition. Standard test procedures can be used to assess the effectiveness of the compounds of this invention as carburetor detergents and as rust or oxidation inhibitors.

Generally speaking, the fuels will contain a suitable amount in the range of up to about 2% by weight of a compound of this invention. The fuels can be any distillate fuel such as gasoline (including so-called reformulated gasolines which contain oxygenates such as alcohols and/or ethers), diesel fuels, kerosenes, jet fuels, burner fuels, home heating oils, gas oils, and the like. Typically, the compounds of this invention are employed in gasoline at suitable concentrations in the range of about 50 to about 400 pounds per thousand barrels (ptb), and preferably in the range of about 75 to about 300 ptb. Preferably, the compounds of this invention are formulated with an appropriate carrier fluid such as a mineral oil carrier fluid or polyol carrier fluid. Proportions will typically fall in the range of from 0.5 to 5 parts by weight of carrier fluid per part by weight of compound of this invention.

Standard intake valve engine tests were conducted using various compounds of this invention. The base fuel was a gasoline that contained no additives. When subjected to the engine test with no additive content, this base fuel produced on the average about 600 mg of intake valve deposits. Compounds of this invention used as additives in the tests and the results obtained therewith are summarized in Table VI. The compounds were formed using procedures illustrated in the above Examples, and in Table VI the compounds are identified with reference to the reactants used in forming them (except for the formaldehyde which of course was used in each reaction). In each case the compounds were employed in the fuel at a concentration of 150 ptb. The abbreviations used in Table VI are the same as in Table V. In addition, IVD refers to intake valve deposit formed on the initially clean valves during the respective tests. No carrier fluids were employed in these tests.

TABLE VI

| Run | Polyamine | Phenol | Jeffamine Product | IVD, mg |
|---|---|---|---|---|
| 1 | DOPPD | 4-dodecylphenol | M-2005 | 2 |
| 2 | TOPPD | 4-dodecylphenol | M-2005 | 3 |
| 3 | TOPPD | 4-dodecylphenol | M-1000 | 1 |
| 4 | DOPPD | 4-dodecylphenol | D-2000 | 22 |
| 5 | DOPPD | 4-dodecylphenol | M-1000 | 74 |
| 6 | TETA | 4-dodecylphenol | M-2005 | 36 |
| 7 | DETA | 4-dodecylphenol | M-2005 | 62* |
| 8 | DETA | 4-dodecylphenol | M-1000 | 7 |
| 9 | TETA | 4-dodecylphenol | M-1000 | 8 |
| 10 | AEP | 4-dodecylphenol | M-2005 | 31* |
| 11 | DETA | 4-nonylphenol | D-2000 | 28** |
| 12 | DETA | 4-nonylphenol | M-1000 | 15 |
| 13 | DOPPD | PPP | M-2005 | 4 |

*Average of two tests
**Average of three tests

It is interesting to note that when the concentration of the compound of Run 7 was increased to 200 ptb, the IVD was 9 mg. This indicates that for each compound there may be an optimum concentration for any given gasoline which can readily be ascertained by test.

The benefits that may be derived by use of a carrier fluid are illustrated by several further engine tests conducted as above wherein the compound tested was a product as in Run 7 but used in combination with Jeffamine D-2000 as a carrier fluid. Table VII summarizes the results. The results of the duplicate runs of Test 7 are repeated in Table VII for ease of reference.

TABLE VII

| Test | Additive conc., ptb | Carrier conc., ptb | IVD, mg |
|---|---|---|---|
| 7 | 150 | none | 62 |
| 14 | 100 | 50 | none |
| 15 | 50 | 100 | 1 |
| 16 | 50 | 50 | 158 |

It can be seen from Table VII that by use of suitable concentrations of additive and carrier it is possible to improve very substantially performance of some of the lesser effective compounds of this invention.

The compounds of this invention are also suitable for use in natural and synthetic oils of lubricating viscosity. Amounts in the range of from about 0.5 to about 5% based on the weight of the finished lubricant or functional fluid composition are generally sufficient to provide effective dispersancy. The compounds of this invention exhibit good compatibility with conventional lubricant additives such as metal-containing detergents, antiwear agents, extreme pressure agents, corrosion inhibitors, foam inhibitors, friction modifiers, viscosity index improvers, pour point depressants, oxidation inhibitors, and the like.

This invention is susceptible to considerable variation in its practice. Accordingly, this invention is not intended to be limited by the specific exemplifications set forth hereinabove. Rather, this invention is intended to cover the subject matter within the spirit and scope of the appended claims and the permissible equivalents thereof.

I claim:

1. A compound in which a polyamine moiety is linked to a phenolic moiety by a Mannich base linkage involving one of the amino groups of the polyamine moiety, and in which an aminoalkylene-poly(oxyalkylene) moiety is linked to said phenolic moiety by a Mannich base linkage involving an amino group of the alkylene-poly(oxyalkylene) moiety.

2. A compound according to claim 1 wherein said polyamine moiety is linked by the Mannich base linkage to an ortho position of said phenolic moiety, and said aminoalkylene-poly(oxyalkylene) moiety is linked by the Mannich base linkage to an ortho position of said phenolic moiety.

3. A compound according to claim 2 wherein said phenolic moiety is derived from a mononuclear monohydric phenol.

4. A compound according to claim 3 wherein said phenolic moiety has a hydrocarbyl substituent in the para position.

5. A compound according to claim 4 wherein said hydrocarbyl substituent is a branched chain dodecyl or a branched chain nonyl group.

6. A compound according to claim 4 wherein said hydrocarbyl substituent is derived by alkylating said mononuclear monohydric phenol with an oligomer or polymer of propene having from 4 up to about 100 propene units per molecule.

7. A compound according to claim 4 wherein said oligomer or polymer is a polypropene having a molecular weight by vapor phase osmometry in the range of about 800 to about 1000.

8. A compound according to claim 2 wherein said phenolic moiety is derived from a dinuclear dihydric bisphenol.

9. A compound according to claim 8 wherein said bisphenol is Bisphenol-A.

10. A compound of the formula:

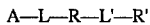

wherein A is a polyamine group having 2 to 10 nitrogen atoms, and is derived from a polyamine; R is a phenolic group derived from a hydroxyaromatic compound; R' is an alkylenepoly(oxyalkylene) group derived from an amino-substituted alkylenepoly(oxyalkylene) compound, and in which the alkylene groups can be the same or different and contain from 2 to 20 carbon atoms each; L is a methyleneamino linkage in which the amino nitrogen atom is one of the nitrogen atoms of the polyamine group; and L' is a methyleneamino linkage in which the nitrogen atom of L' is a nitrogen atom of an amino substituent in the alkylenepoly(oxyalkylene) group.

11. A compound in accordance with claim 10 wherein the hdroxyaromatic reactant from which R is derived is a monoalkylated phenol in which the alkyl substituent is derived from a polymer of propene having a molecular weight by vapor phase osmometry in the range of about 800 to about 1000.

12. A compound in accordance with claim 11 wherein R' is an amino-substituted alkylenepoly(oxyalkylene) group derived by removal of one amino hydrogen atom from a polyamino-substituted alkylenepoly(oxyalkylene) reactant of the formula:

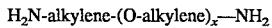

wherein the alkylenes can be the same or different and contain from 2 to 5 carbon atoms each, and x is an average number in the range of about 10 to about 80.

13. A compound in accordance with claim 11 wherein R' is an amino-substituted alkylenepoly(oxyalkylene) group derived by removal of one amino hydrogen atom from a polyamino-substituted alkylenepoly(oxyalkylene) reactant of the formula:

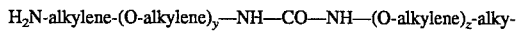

lene-NH₂ wherein the alkylenes can be the same or different and contain from 2 to 5 carbon atoms each, and y and z can be the same or different and each is an average number in the range of from 2 to 20.

14. A compound in accordance with claim 11 wherein R' is a polyamino-substituted alkylenepoly(oxyalkylene) group derived by removal of one amino hydrogen atom from a polyamino-substituted alkylenepoly(oxyalkylene) reactant of the formula:

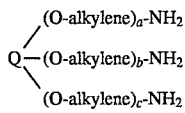

wherein the alkylenes can be the same or different and contain from 2 to 5 carbon atoms each, Q is the hydrocarbyl residue of a triol, and a, b and c can be the same or different and each is an average number in the range of from 1 to about 35, the sum of a, b and c being in the range of about 5 to about 100.

15. A compound in accordance with claim 11 wherein R' is an amino-substituted alkylenepoly(oxyalkylene) group derived by removal of one amino hydrogen atom from the amino-substituted alkylenepoly(oxyalkylene) reactant of the formula:

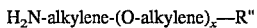

wherein the alkylene groups can be the same or different and contain from 2 to 5 carbon atoms each, x is an average number in the range of about 10 to about 60, and R" is a hydrocarbyl group of up to about 18 carbon atoms.

16. A compound in accordance with claim 15 wherein the alkylene groups are a combination of ethylene and methylethylene groups, x is an average number in the range of about 10 to about 40, and R" is an alkyl group of up to about 12 carbon atoms.

17. A compound according to claim 16 wherein said amino-substituted alkylenepoly(oxyalkylene) reactant has a molecular weight in the range of about 1000 to about 2000 and wherein R" is methyl.

18. A compound according to claim 11 wherein the polyamine moiety is derived from a mixture of straight chain, branched chain and cyclic ethylene polyamines having about 2 to about 10 nitrogen atoms in the molecule.

19. A compound in accordance with claim 11 wherein the polyamine moiety is derived from diethylene triamine, triethylene tetramine or N-aminoethylpiperazine.

20. A compound according to claim 11 wherein the polyamine moiety is derived from N-decyloxy-1,3-propanediamine or N-tridecyloxy-1,3-propanediamine.

21. A compound formed by reacting in the first stage a phenolic compound having at least two unsubstituted ortho positions or at least one unsubstituted ortho and one unsubstituted para position with an aldehyde and either (i) a polyamine having at least one primary or secondary amino group capable of undergoing a Mannich condensation reaction with said phenolic compound, or (ii) an alkylene-poly(oxyalkylene) compound having at least one primary or secondary amino group capable of undergoing a Mannich condensation reaction with said phenolic compound in proportions to form an intermediate Mannich condensation product enriched in mono-substituted Mannich condensation product, and then reacting said intermediate Mannich condensation product in a second stage Mannich condensation reaction with an aldehyde and whichever of (i) and (ii) was not used in the first stage.

22. A compound according to claim 21 wherein the aldehyde used in both said reactions is formaldehyde or a formaldehyde-producing reagent, wherein the polyamine used has at least one terminal primary amino group, and wherein the alkylene-poly(oxyalkylene) compound used has at least one terminal primary amino group.

23. A compound according to claim 22 wherein (i) is diethylene triamine, triethylene tetramine or N-aminoethylpiperazine, and (ii) is a compound of the formula:

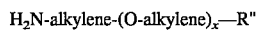

wherein the alkylene groups can be the same or different and contain from 2 to 5 carbon atoms each, x is an average number in the range of about 10 to about 60, and R" is a hydrocarbyl group of up to about 18 carbon atoms.

24. A compound in accordance with claim 23 wherein the alkylene groups are a combination of ethylene and methylethylene groups, x is an average number in the range of about 10 to about 40, and R" is an alkyl group of up to about 12 carbon atoms.

25. A compound according to claim 24 wherein (ii) has a molecular weight in the range of about 1000 to about 2000 and wherein R" is methyl.

26. A compound according to claim 22 wherein (i) is N-decyloxy-1,3-propanediamine or N-tridecyloxy-1,3-propanediamine, and (ii) is a compound of the formula:

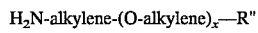

wherein the alkylene groups can be the same or different and contain from 2 to 5 carbon atoms each, x is an average number in the range of about 10 to about 60, and R" is a hydrocarbyl group of up to about 18 carbon atoms.

27. A compound in accordance with claim 26 wherein the alkylene groups are a combination of ethylene and methylethylene groups, x is an average number in the range of about 10 to about 40, and R" is an alkyl group of up to about 12 carbon atoms.

28. A compound according to claim 27 wherein (ii) has a molecular weight in the range of about 1000 to about 2000 and wherein R" is methyl.

29. A process for the preparation of a compound of claim 1 which comprises reacting in a first stage a phenolic compound having at least two unsubstituted ortho positions or at least one unsubstituted ortho and one unsubstituted para position with an aldehyde and either (i) a polyamine having at least one primary or secondary amino group capable of undergoing a Mannich condensation reaction with said phenolic compound, or (ii) an alkylene-poly(oxyalkylene) compound having at least one primary or secondary amino group capable of undergoing a Mannich condensation reaction with said phenolic compound in proportions to form an intermediate Mannich condensation product enriched in mono-substituted Mannich condensation product, and then reacting said intermediate Mannich condensation product in a second stage Mannich condensation reaction with an aldehyde and whichever of (i) and (ii) was not used in the first stage.

30. A process according to claim 29 wherein (ii) has the formula:

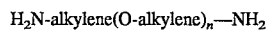

wherein the alkylenes can be the same or different and contain from 2 to 20 carbon atoms each, and n is a number in the range of 2 to 150.

31. A process according to claim 29 wherein (ii) has the formula:

$$H_2N\text{-alkylene-}(O\text{-alkylene})_x\text{—}R''$$

wherein the alkylene groups can be the same or different and contain from 2 to 5 carbon atoms each, x is an average number in the range of about 10 to about 60, and R" is a hydrocarbyl group of up to about 18 carbon atoms.

32. A distillate fuel for use in an internal combustion engine containing a compound in accordance with claim 1 in an amount at least sufficient to minimize induction system deposit formation.

33. A gasoline fuel for use in an internal combustion engine containing a compound in accordance with claim 23 in an amount at least sufficient to minimize induction system deposit formation.

34. A gasoline fuel for use in an internal combustion engine containing a compound in accordance with claim 24 in an amount at least sufficient to minimize induction system deposit formation.

35. A gasoline fuel for use in an internal combustion engine containing a compound in accordance with claim 25 in an amount at least sufficient to minimize induction system deposit formation.

36. A gasoline fuel for use in an internal combustion engine containing a compound in accordance with claim 26 in an amount at least sufficient to minimize induction system deposit formation.

37. A gasoline fuel for use in an internal combustion engine containing a compound in accordance with claim 27 in an amount at least sufficient to minimize induction system deposit formation.

38. A gasoline fuel for use in an internal combustion engine containing a compound in accordance with claim 28 in an amount at least sufficient to minimize induction system deposit formation.

39. A fuel in accordance with claim 32 additionally containing in the range of from about 0.5 to 5 parts by weight of carrier fluid per part by weight of said compound.

40. An additive composition for addition to fuel for internal combustion engines which comprises a compound in accordance with claim 1 and in the range of from about 0.5 to 5 parts by weight of carrier fluid per part by weight of said compound.

41. A method of minimizing induction system deposits in an internal combustion engine which comprises operating said engine on a distillate fuel containing a compound in accordance with claim 1 in an amount at least sufficient to minimize induction system deposits in said engine.

42. A method in accordance with claim 41 wherein said engine is a gasoline engine, wherein said distillate fuel is a gasoline fuel, and wherein at least intake valve deposits are minimized in said engine.

43. A method in accordance with claim 42 wherein said gasoline fuel additionally contains in the range of from about 0.5 to 5 parts by weight of carrier fluid per part by weight of said compound.

* * * * *